(12) United States Patent
You et al.

(10) Patent No.: US 11,325,264 B1
(45) Date of Patent: May 10, 2022

(54) TENDON-DRIVEN ROBOTIC HAND

(71) Applicants: UBTECH NORTH AMERICA RESEARCH AND DEVELOPMENT CENTER CORP, Pasadena, CA (US); UBTECH ROBOTICS CORP LTD, Shenzhen (CN)

(72) Inventors: Won Suk You, Pasadena, CA (US); Chengkun Zhang, Pasadena, CA (US); Huan Tan, Pasadena, CA (US); Youjun Xiong, Shenzhen (CN)

(73) Assignees: UBTECH NORTH AMERICA RESEARCH AND DEVELOPMENT CENTER CORP, Pasadena, CA (US); UBTECH ROBOTICS CORP LTD, Shenzhen (CN)

( * ) Notice: Subject to any disclaimer, the term of this patent is extended or adjusted under 35 U.S.C. 154(b) by 0 days.

(21) Appl. No.: 17/095,758

(22) Filed: Nov. 12, 2020

(51) Int. Cl.
*B25J 15/00* (2006.01)
*B25J 9/10* (2006.01)
*B25J 9/12* (2006.01)

(52) U.S. Cl.
CPC ......... *B25J 15/0009* (2013.01); *B25J 9/1045* (2013.01); *B25J 9/1075* (2013.01); *B25J 9/123* (2013.01)

(58) Field of Classification Search
CPC .. B25J 15/0009; B25J 15/0213; B25J 9/1045; B25J 9/1075; B25J 9/123; B25J 17/0275
USPC .................................................. 294/106, 111
See application file for complete search history.

(56) References Cited

U.S. PATENT DOCUMENTS

| | | | | | |
|---|---|---|---|---|---|
| 4,921,293 | A | * | 5/1990 | Ruoff | B25J 15/0009 294/111 |
| 4,957,320 | A | * | 9/1990 | Ulrich | B25J 9/102 192/56.1 |
| 4,986,723 | A | * | 1/1991 | Maeda | B25J 9/06 294/111 |
| 5,570,920 | A | * | 11/1996 | Crisman | B25J 9/104 294/111 |
| 6,896,704 | B1 | * | 5/2005 | Higuchi | B25J 15/0009 623/64 |
| 8,419,096 | B2 | * | 4/2013 | Kim | B25J 15/0009 294/111 |
| 8,573,663 | B1 | * | 11/2013 | Lin | B25J 15/0009 294/111 |
| 8,579,343 | B2 | * | 11/2013 | Park | B25J 15/0009 294/111 |

(Continued)

*Primary Examiner* — Paul T Chin

(57) ABSTRACT

A robotic hand includes a baseplate, a finger having multiple phalanges that are rotatably coupled to one another, a first of the phalanges having a first end rotatably coupled to the baseplate and a second end and a second of the phalanges rotatably coupled to the second end about an axis of rotation, an actuating mechanism mounted on the baseplate, the actuating mechanism configured to actuate rotation of the plurality of phalanges, and a tendon having opposite ends that are respectively attached to the second of the phalanges and the baseplate. The second of the phalanges has an engagement portion arranged around the axis of rotation, and the tendon is wrapped around a portion of the engagement portion to generate a force acting on the second end of the first of the phalanges, causing the first of the phalanges to rotate from a flexed state to an extended state.

20 Claims, 15 Drawing Sheets

(56) References Cited

U.S. PATENT DOCUMENTS

| | | | |
|---|---|---|---|
| 8,991,884 B2* | 3/2015 | DeLouis | B25J 15/0009 |
| | | | 294/106 |
| 9,669,551 B1* | 6/2017 | Salisbury | B25J 15/0475 |

* cited by examiner

TENDON-DRIVEN ROBOTIC HAND

TECHNICAL FIELD

The present disclosure generally relates to robotic hands, and particularly to a robotic hand having multiple fingers and having more human-like grasping qualities.

BACKGROUND

Robotic hands are generally composed of a base and multiple finger links connected to the base. Each of the finger links comprise one or more phalanges akin to joints of a human hand. Many conventional robotic hands focus on simulating the overall appearance and movement of the human hand while neglecting other equally important features such as size, weight, mobility and control of the robotic hand. Therefore, these conventional robotic hands are relatively complex, large, and cumbersome.

In one example, one conventional robotic hand provides a total of 24 degrees of freedom (DOF) with relatively good finger movement, but this robotic hand requires the number of cables (or "tendons") and actuators to be up to twice the number of DOF, or forty-eight in this case. This results in a large form factor. Another conventional robotic hand includes multiple fingers, where each finger has multiple degrees of freedom, which requires complex mechanical drive mechanisms to affect bending and rotational movement of the fingers.

Therefore, there is a need to provide a robotic hand that is lightweight and simple in mechanical drive mechanism, yet is capable of grasping various objects of different size and shapes.

BRIEF DESCRIPTION OF DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
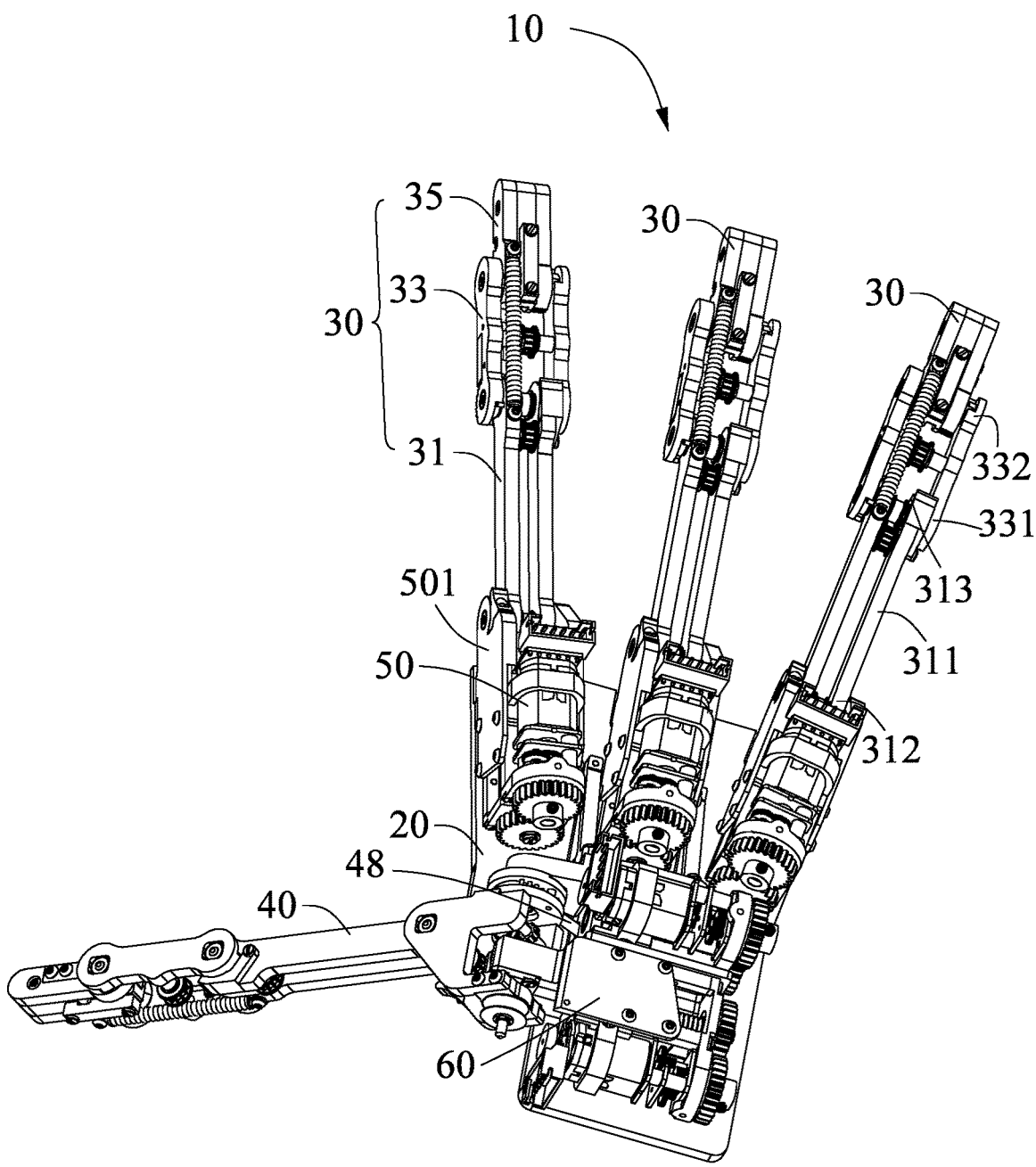
FIG. 1 is an isometric view of a robotic hand according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

Figure 4:
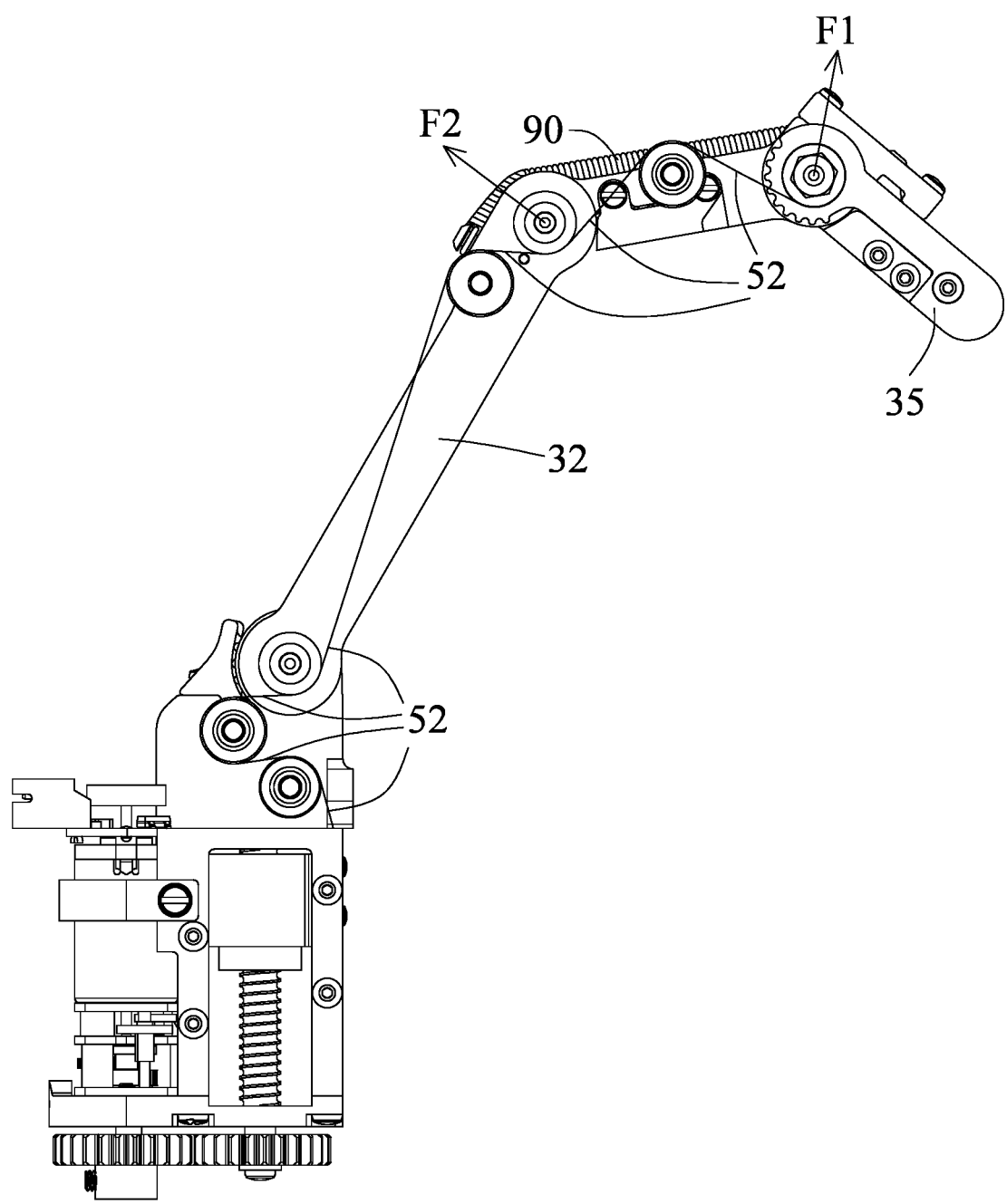
FIG. 4 is a side view of a finger of the robotic hand, with its phalanges in their flexed state.

A finger of a human hand has two or more joints that allow the finger to flex (bend) and extend (straighten) and give the ability of the hand to perform all its functions from grasping to waving and pinching tiny objects. As used herein, the term "flexed state" of a phalanx of a finger is defined as a state when the phalanx has rotated away from its original position, and the term "extended state" of a phalanx is defined as a state when the phalanx is in its original position. FIG. 1 shows that all the fingers (i.e., index finger, middle finger, ring finger and a thumb) are extended and all the phalanges of the robotic hand are in their original positions. Since the phalanx of a finger is able to rotate to many different positions, there are many different flexed states for the phalanx. For example, FIG. 4 shows that a finger is flexed and the three phalanges of the finger are in a flexed state.

FIG. 1 is an isometric view of a robotic hand according to one embodiment. The robotic hand includes a number of fingers that can be arranged and moved in a manner similar to a human hand. For example, the robotic hand may include four fingers that imitate the index finger, middle finger, ring finger, and the thumb of a human hand. If desired, an additional finger can be included to imitate the little finger of a human hand. Each finger may include three phalanges corresponding to a distal phalanx, middle phalanx, and proximal phalanx of a human hand. Each of the fingers can be flexed to grasp objects, and can be extended to be in a substantially straight configuration as shown in FIG. 1. The "thumb" of the robotic hand can further rotate with respect to a baseplate of the robotic hand, which is similar to palmar abduction/adduction of the thumb a human hand. Each of the fingers can be independently controlled to allow the robotic hand to grasp different objects using different combination of fingers. For example, the robotic hand can hold a water bottle using all of the four fingers, and can pinch a key using only the thumb and the index finger.

Figure 2:
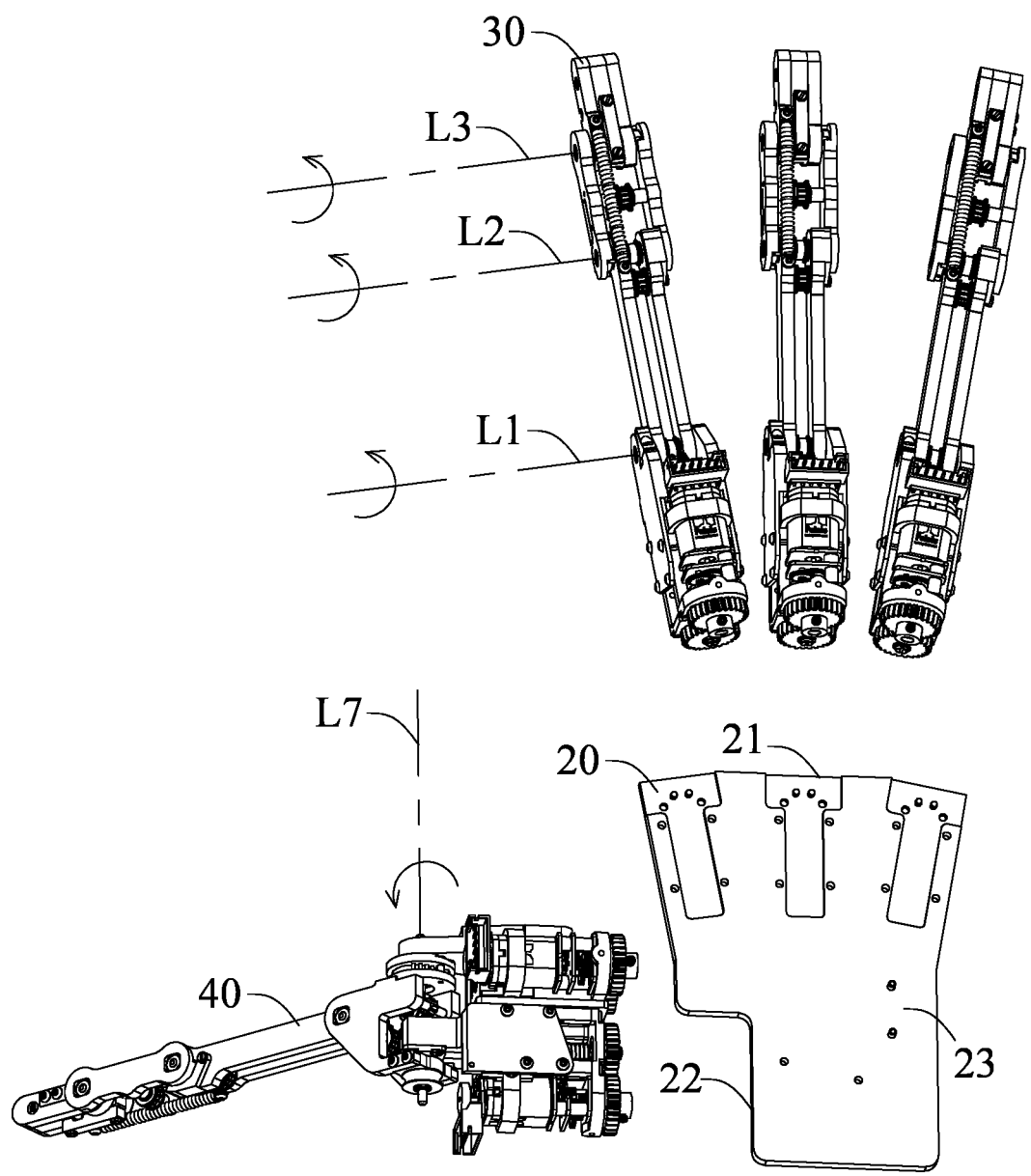
FIG. 2 is an isometric exploded view of the robotic hand of FIG. 1.
Figure 3:
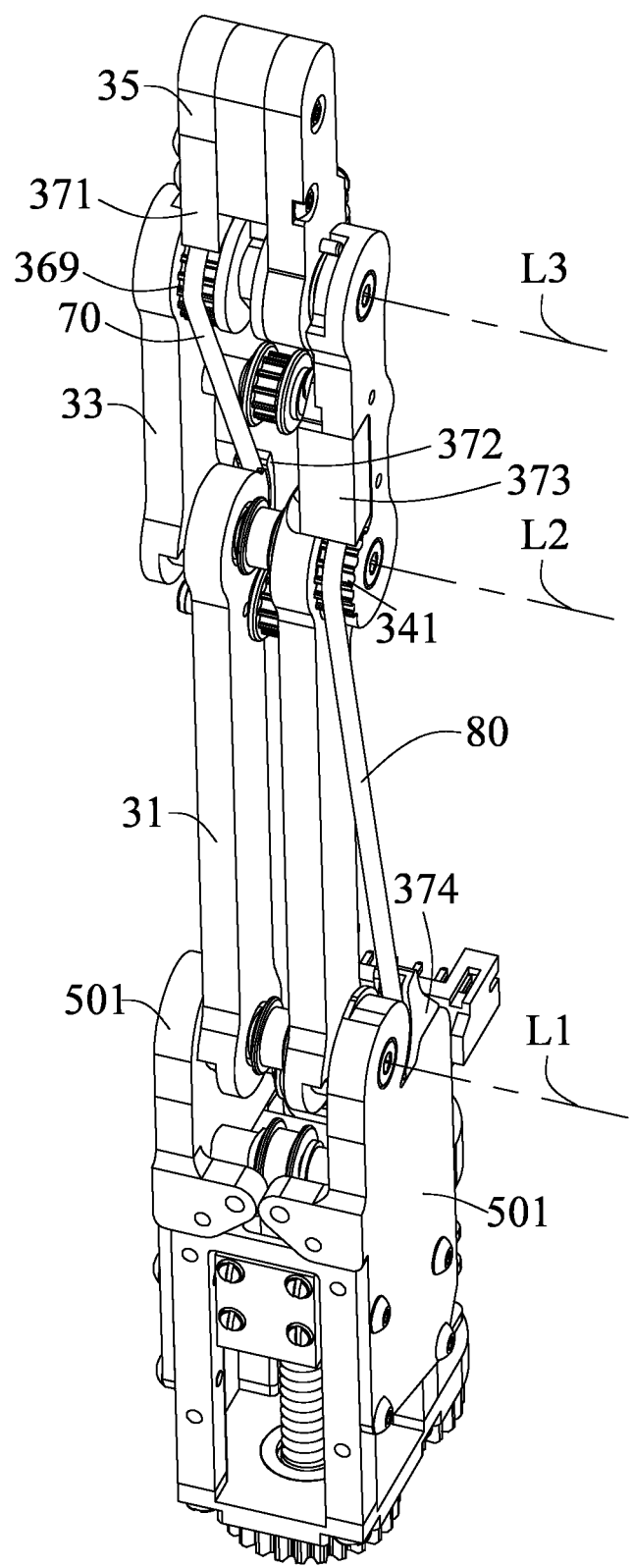
FIG. 3 is an isometric view of a finger of the robotic hand, with its phalanges in their extended state.

With reference to FIGS. 1 and 2, in one embodiment, the robotic hand 10 includes a baseplate 20, a number of first fingers 30, and a second finger 40 that are coupled to the baseplate 20. Each of the first fingers 30 and the second finger 40 includes three phalanges that are rotatably coupled to one another. The first fingers 30 and the second finger 40 can thus be extended and flexed like a finger of a human hand. The robotic hand 10 further includes an actuating mechanism 50 for each first finger 30, and an actuating mechanism 60 for the second finger 40. The actuating mechanisms 50 and the actuating mechanism 60 are mounted on the baseplate 20 and configured to actuate rotation of the phalanges of the first fingers 30 and the second finger 40. With reference to FIG. 3, the robotic hand 10 further includes a first tendon 70 for each of the first fingers 30 and the second finger 40. Opposite ends of the first tendon 70 are respectively attached to two phalanges of each of the first fingers 30 and the second finger 40. The first tendon 70 is configured to generate a force that acts on one of the two phalanges, causing one of the two phalanges to rotate from a flexed state to the extended state.

Broadly speaking, grasps of a human hand can be divided into two groups, precision grasps and power grasps. A precision grasp is executed between the terminal digit pads of the thumb and fingers. The precision grasp is used when the hand is required to perform delicate handling or manipulation. A power grasp is executed between the surfaces of the fingers/thumb and the palm and is used when a secure grasp is essential. The robotic hand 10 is anthropomorphic in design. In one embodiment, the baseplate 20 is a flat plate and can be viewed as a "palm" of the robotic hand 10. However, the example of FIGS. 1 and 2 is only an illustrative example and the configuration of the baseplate 20 can change according to actual needs. For example, the baseplate 20 may be not a complete flat plate and may include a curved portion. The robotic hand 10 can form power grasps by using the baseplate 20 and the fingers 30 and 40 analogous to a human hand. The first fingers 30 are coupled to the baseplate 20 adjacent to a first edge 21 of the baseplate 20, and the second finger 40 is coupled to the baseplate 20 adjacent to a second edge 22 of the baseplate 20.

In one embodiment, the number of the first fingers 30 is three. It should be noted that the number of the first fingers 30 can be changed according to needs. The first fingers 30 from left to right in FIG. 1 can also be referred to as index finger, middle finger and ring finger, respectively. The second finger 40 can also be referred to as a thumb. The first fingers 30 have the same configuration, and the second finger 40 have a configuration similar to the fingers 30. As shown in FIG. 2, in one embodiment, each first finger 30 and one corresponding actuating mechanism 50 are coupled to each other to form a single module, and the second finger 40 and the actuating mechanism 30 are coupled to each other to form a single module. Such modular design allows for easy reconfiguration of the robotic hand 10. For example, a new robotic hand including four fingers 30 can be easily created by replacing the baseplate 20 with a new baseplate and mounting the original fingers 30 and 40 and a new finger 30 to the new baseplate.

In one embodiment, each finger 30 includes a first phalanx 31, a second phalanx 33 and a third phalanx 35 that are rotatably coupled to one another. The first phalanx 31 has an elongated body 311 defining a first end (i.e., lower end) 312 and an opposite second end (i.e., upper end) 313. The first end 312 is rotatably coupled to the baseplate 20 and rotatable about a first axis of rotation L1. In the embodiment the first end 312 is coupled to the baseplate 20 through two fixing plates 501. The second phalanx 33 has a first end (i.e., lower end) 331 and an opposite second end (i.e., upper end) 332. The first end 331 is rotatably coupled to the second end 313 of the first phalanx 31 and rotatable about a second axis of rotation L2 that is substantially parallel to the first axis of rotation L1. The lower end of the third phalanx 35 is rotatably coupled to the second end 332 of the second phalanx 33. The third phalanx 35 is rotatable about a third axis of rotation L3 that is substantially parallel to the first axis of rotation L1. When desired, the first phalanx 31, the second phalanx 33 and the third phalanx 35 can be rotated from the extended state as shown in FIG. 3 to a desired flexed state, such as the flexed state as shown in FIG. 4, causing the finger 30 to be flexed.

Figure 5:
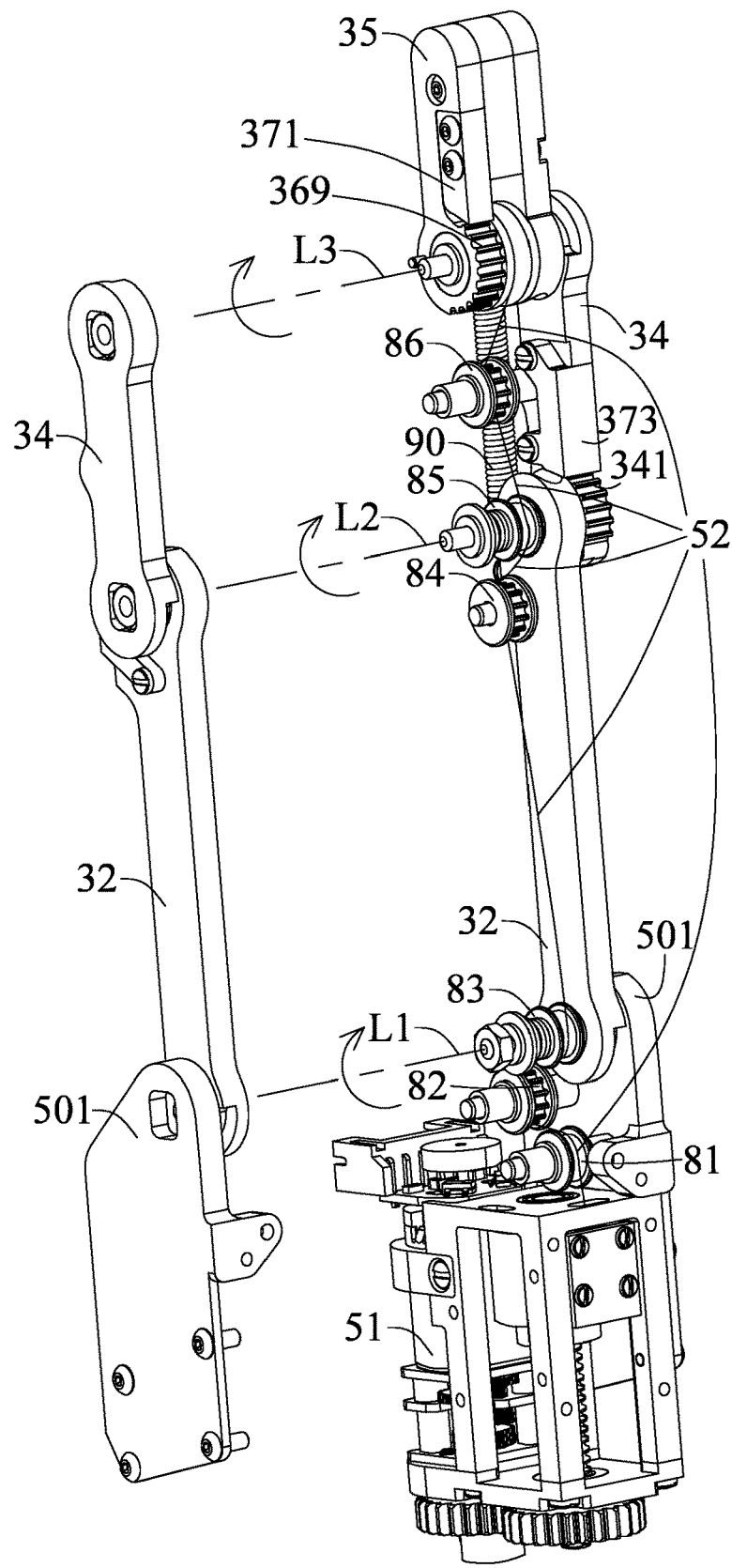
FIG. 5 is an isometric exploded view of the finger of FIG. 3.
Figure 6:
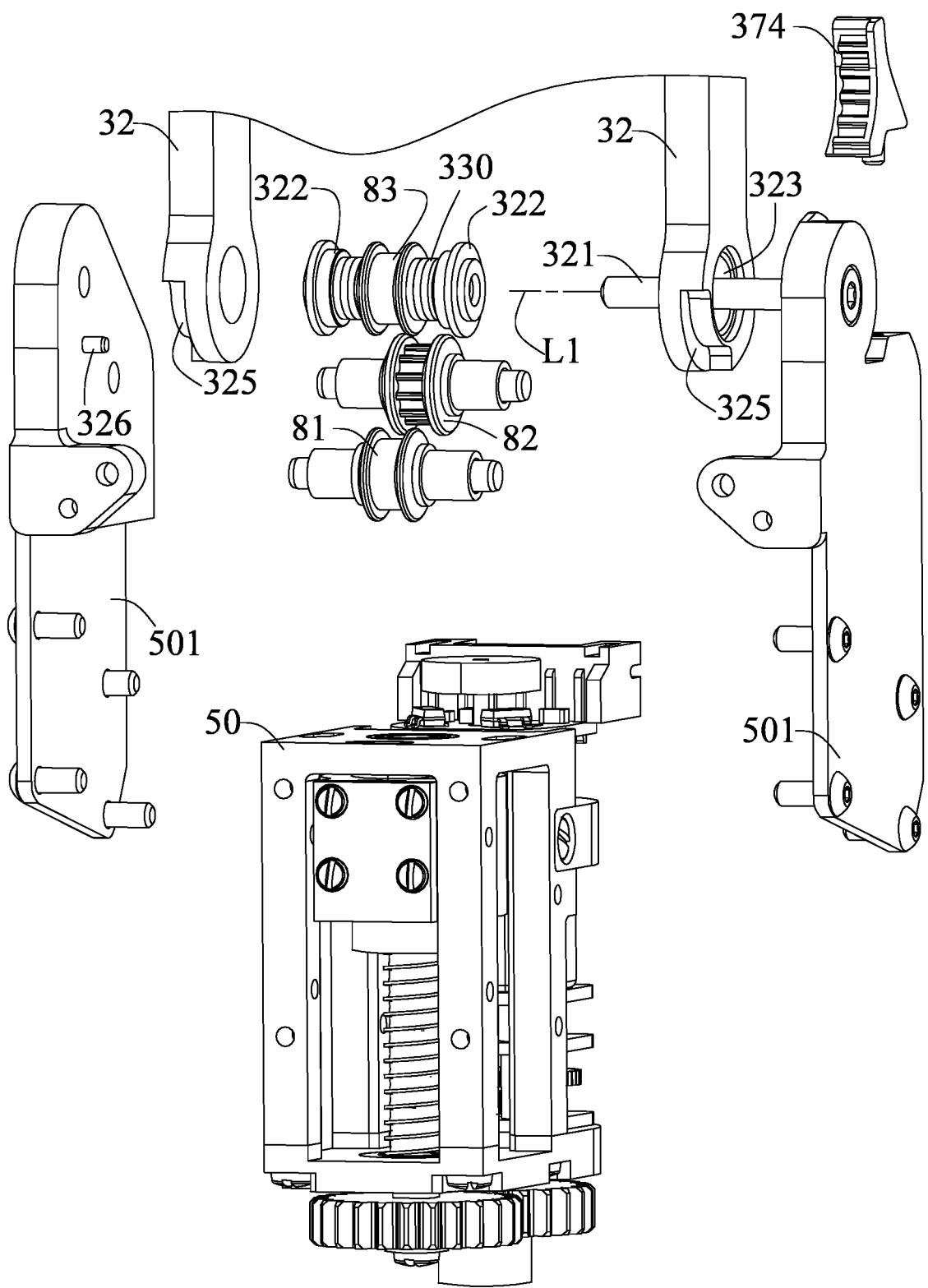
FIG. 6 is an isometric exploded of a lower portion of the finger of FIG. 3.

With reference to FIGS. 5 and 6, in one embodiment, the first phalanx 31 includes two linkage bars 32 that may have the same length and are substantially parallel to each other. Lower ends of the linkage bars 32 are coupled to the baseplate 20. Specifically, two fixing plates 501 are fixed to the back side 23 (i.e., the side serving as the dorsum of the robotic hand 10, see FIG. 2) of the baseplate 20. The two fixing plates 501 are substantially perpendicular to the back side 23 and substantially parallel to each other. The lower ends of the linkage bars 32 are located between the two fixing plates 501, and rotatably coupled to the two fixing plates 501 through a shaft 321 and two bearings 322. Opposite ends of the shaft 321 are respectively fixed to the top ends of the two fixing plates 501. Each linkage bar 32 defines a bearing hole 323 in a side facing a corresponding fixing plate 501 and adjacent to its lower end. The outer rings of the two bearings 322 are inserted into the bearing holes 323, and the inner rings of the two bearings 322 are securely arranged around the shaft 321. The two linkage bars 32 are thus rotatable with respect to the two fixing plates 501 as well as the baseplate 20 about the first axis of rotation L1. The robotic hand 10 further includes components for limiting axial movement of the two linkage bars 32 along the shaft 321, which will be described in detailed below.

In one embodiment, as shown in FIG. 6, one of the linkage bars 32 may define a recess 325 in the side facing the corresponding fixing plate 501. A post 326 may protrude from the inner side of the fixing plates 501 facing the one of the linkage bars 32, and is received in the recess 325. When neither of the two ends of the recess 325 is in contact with the post 326, the linkage bars 32 can rotate freely. When one of the two ends of the recess 325 comes into contact with the post 326, rotation of the linkage bars 32 is stopped.

Figure 7:
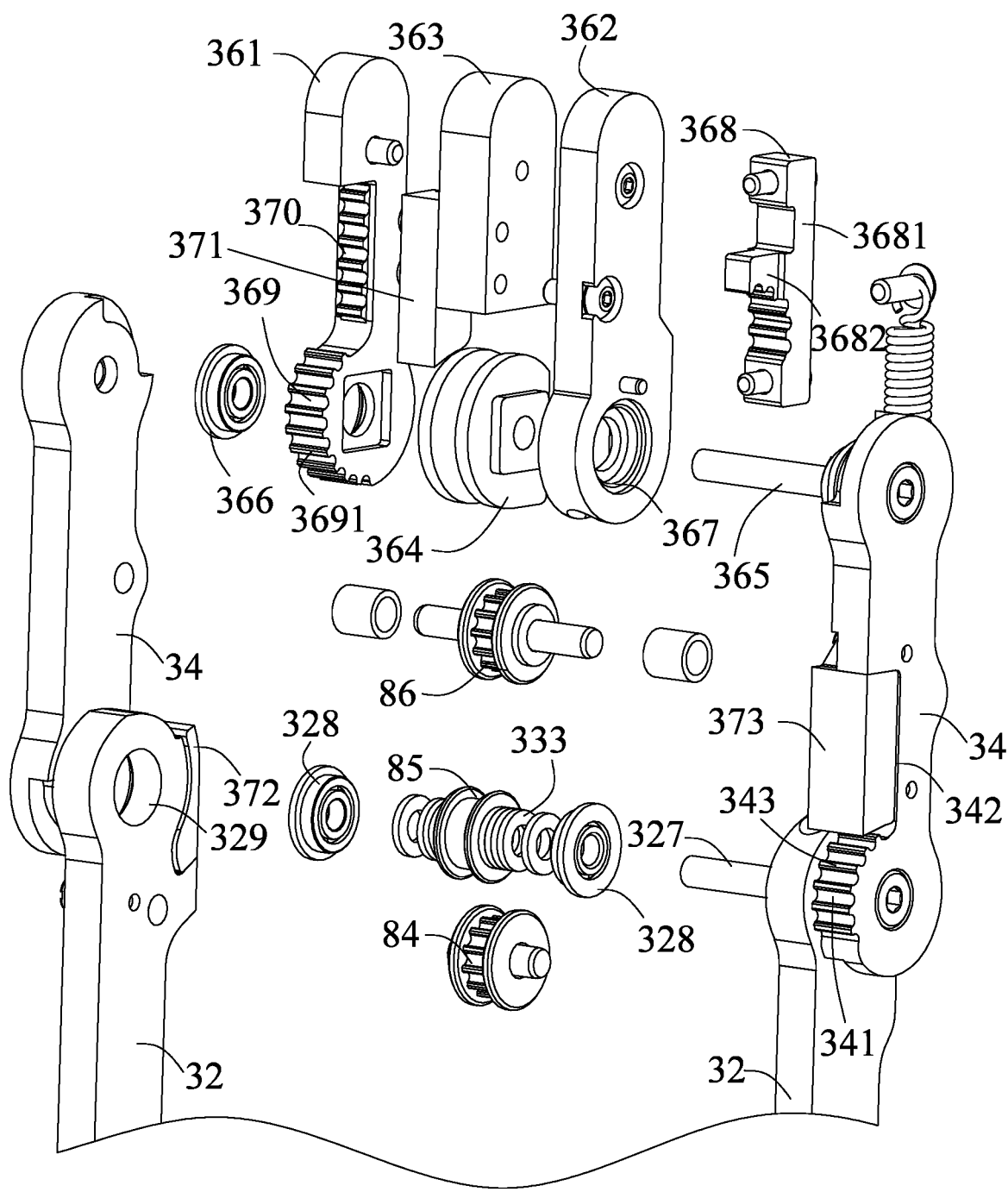
FIG. 7 is an isometric exploded of an upper portion of the finger of FIG. 3.

With reference to FIG. 7, the second phalanx 33 includes two linkage bars 34. The upper ends of the linkage bars 32 are located between the lower ends of the linkage bars 34, and are rotatably coupled to the lower ends of the linkage bars 34 through a shaft 327 and two bearings 328. Opposite ends of the shaft 327 are fixed to the two linkage bars 34. Each linkage bar 32 defines a bearing hole 329 adjacent to its upper end. The outer rings of the two bearings 328 are inserted into the bearing holes 329, and the inner rings of the two bearings 328 are securely arranged around the shaft 327. The upper ends of the two linkage bars 32 are thus rotatable with respect to the lower ends of the linkage bars 34 about the axis of rotation L2. The robotic hand 10 further includes components for limiting axial movement of the two linkage bars 32 along the shaft 327, which will be described in detailed below.

In one embodiment, the third phalanx 35 includes a first side member 361, a second side member 362, a connection member 363, and a pulley 364. The connection member 363 and the pulley 364 are arranged between the first side member 361 and the second side member 362. The first side member 361 and the second side member 362 are fixed to opposite sides of the connection member 363. The pulley 364 is securely sandwiched between the first side member 361 and the second side member 362. The first side member 361 and the second side member 362 are rotatably coupled to the linkage bars 34 through a shaft 365 and two bearings 366. The shaft 365 passes through the first side member 361, the pulley 364, and the second side member 362. Opposite ends of the shaft 365 are fixed to the upper ends of the linkage bars 34. Each of the first side member 361 and the second side member 362 defines a bearing hole 367. The outer rings of the bearings 366 are fit into the bearing holes 367, and the inner rings of the bearings 366 are securely arranged around the shaft 365. The third phalanx 35 is thus rotatable with respect to the second phalanx 33 about the axis of rotation L3.

In one embodiment, each of the fingers 30 and 40 is a cable-driven finger, and can be flexed when pulled by a single cable/belt. Specifically, with reference to FIGS. 4, 5 and 8, the actuating mechanism 50 includes a linear actuator 51 and a flexor (e.g., a cable, a belt, etc.) 52 having opposite ends attached to the third phalanx 35 and the linear actuator 51. The linear actuator 51 is configured to provide a linear motion to pull the flexor 52. The flexor 52 is configured to pull the first phalanx 31, the second phalanx 33, and the third phalanx 35 to rotate so as to flex the finger 30. In the embodiment, one end (i.e., the upper end) of the flexor 52 is fixed to the pulley 364 through a flexor fixing member 368 (see FIG. 7). The flexor fixing member 368 can be fixed to the connection member 363 and the pulley 364 by screws. The flexor fixing member 368 includes a main body 3681 and protruding portion 3682 protruding from the main body 3681. The protruding portion 3682 is received in the groove of the pulley 364. One end of the flexor 52 is received in the groove of the pulley 364, and is tightly sandwiched between the bottom of the groove and the protruding portion 3682, as well as between the back of the pulley 364 and a lower portion of the main body 3681.

When the actuating mechanism 50 operates, the flexor 52 is pulled and generates a pulling force on the pulley 364, and the pulling force then drives the third phalanx 35 to rotate with respect to the second phalanx 33. A pulling force is transferred to the shaft 365, and drives the second phalanx 33 to rotate with respect to the first phalanx 31. During rotation of the second phalanx 35, a pulling force is transferred to the shaft 327, and drives the first phalanx 31 to rotate with respect to the baseplate 20. Rotation of the first phalanx 31, the second phalanx 33 and the third phalanx 35 results in flexion of the finger 30, just like flexion of the finger of a human hand.

With reference to FIGS. 5-7, in one embodiment, the robotic hand 10 further includes a number of idler pulleys for guiding the flexor 52 and reducing vibration of the flexor 52. For example, the robotic hand 10 may include a first idler pulley 81, a second idler pulley 82, a third idler pulley 83, a fourth idler pulley 84, a fifth idler pulley 85, and a sixth idler pulley 86. The first idler pulleys 81 and the second idler pulleys 82 are disposed between and rotatably coupled to the fixing plates 501. The third idler pulley 83 is rotatably arranged around the shaft 321. The fourth idler pulleys 84 is disposed between and rotatably coupled to the linkage bars 32. The fifth idler pulley 85 is rotatably arranged around the shaft 327. The sixth idler pulley 86 is disposed between and rotatably coupled to the linkage bars 34. The flexor 52 runs over these idler pulleys, and these idler pulleys rotate and guide the flexor 52 when the flexor 52 is pulled by the linear actuator 51 and moves relative to these idler pulleys. In one embodiment, the flexor 52 can be a timing belt, and the second idler pulley 82, the fourth idler pulley 84 and the sixth idler pulley 86 are timing belt pulleys. In the embodiment, a front side of the flexor 52 having teeth is wrapped around the second idler pulley 82, the fourth idler pulley 84 and the sixth idler pulley 86, while the back side of flexor 52 having no teeth is wrapped around the first idler pulley 81, the third idler pulley 83 and the fifth idler pulley 85. This requires that the timing belt pulleys (i.e., pulleys 82, 84 and 86) and the other pulleys (i.e., pulleys 81, 83 and 85) are arranged in an alternating manner along the lengthwise direction of the finger 30.

In one embodiment, the third idler pulley 83 is axially held in position by a number of spacing members 330. Specifically, each spacing member 330 may be a ring arranged around the shaft 321 where the third idler pulley 83 is mounted. A number of spacing members 330 are sandwiched between the pulley 83 and each of the linkage bars 32. One or more spacing members 330 are sandwiched between each linkage bar 32 and the fixing plate 501 adjacent to the linkage bar 32. The spacing members 330 prevents axial movement of the linkage bars 32 and the third idler pulley 83 along the shaft 321. Similarly, a number of spacing members 333 are arranged around the shaft 327 where the fifth idler pulley 85 is mounted. A number of spacing members 333 are sandwiched between the fifth idler pulley 85 and each of the linkage bars 32. One or more spacing members 330 are sandwiched between each linkage bar 32 and the linkage bar 34 adjacent to the linkage bar 32. The spacing members 333 prevent axial movement of the linkage bars 32 and the fifth idler pulley 85 along the shaft 327.

Figure 8:
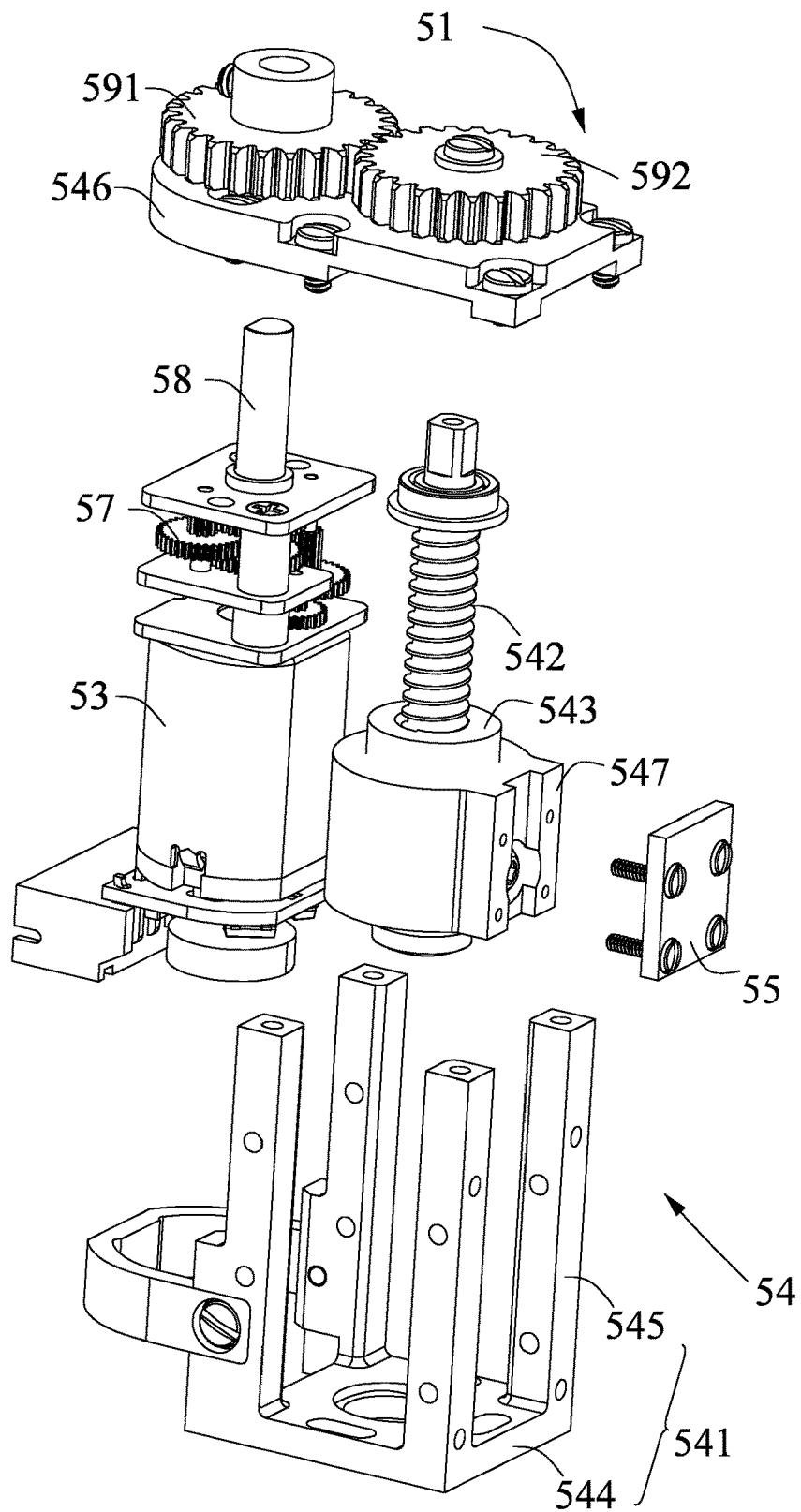
FIG. 8 is an isometric exploded of an actuating mechanism of the robotic hand according to one embodiment.

With reference to FIG. 8, in one embodiment, the linear actuator 51 includes a motor 53, a transmission mechanism 54 fixed to the baseplate 20, and a sliding member 55. Th motor 53 and the sliding member 55 are coupled to the transmission mechanism 54. The transmission mechanism 54 is configured to convert rotary motion of the motor 53 to linear motion of the sliding member 55. One of the opposite ends of the flexor 52 is fixed to the sliding member 55, and the flexor 52 is pulled to move when the sliding member 55 slides. In the embodiment, the transmission mechanism 54 includes a frame 541 fixed to the baseplate 20, a back-drivable ball screw 542 that is rotatably coupled to the frame 541 and configured to receive the rotary motion of the motor 53, and a collar (e.g., a ball nut) 543 rotatably coupled to the ball screw 542 and slidable relative to the frame 541. The sliding member 55 is fixed to the collar 543. The ball screw 542 has superior mechanical efficiency and low internal friction that allows for back-drive under load. In addition, back-drivability allows to use motor current as meaningful sensory input. It is possible to realize sensor-less soft/fragile object grasping, and can increase robustness of the finger 30 from sudden impact with active current control.

In the embodiment, the frame 541 includes a base 544, four bars 545 that protrude from four corners of the base 544 and substantially parallel to one another, a cap 546 fixed to the ends of the bars 545. The motor 53 is fixed to two bars 545. Each of the fixing plates 501 is fixed to another two bars 545, and one finger 30 and the actuating mechanism 50 are thus integrated into a single module. Opposite ends of the ball screw 542 are rotatably coupled to the base 544 and the cap 546. The collar 543 is arranged around the ball screw 542, and defines internal helical ball path for accommodating recirculating balls that are arranged between the collar 543 and the ball screw 542. The collar 543 includes a main body and a protrusion 547 on the main body. The protrusion 547 is arranged between the two guiding bars 545 opposite the motor 53. The protrusion 547 has a width that is slightly smaller than the distance between the space defined by the two guiding bars 545 such that the protrusion 547 moves between and along the two guiding bars 545 when the ball screw 542 rotates. The sliding member 55 is fixed to the protrusion 547 and movable together with the protrusion 547. One end of the flexor 52 is securely sandwiched between the protrusion 547 and the sliding member 54, and movable together with the sliding member 55. It should be noted that in other embodiments the sliding member 55 and the protrusion 547 can be integrally formed.

In one embodiment, the linear actuator 51 further includes a speed reduction mechanism 57 connected to motor 53 and an output shaft 58. The speed reduction mechanism 57 is configured to connect the output shaft 58 to the motor shaft of the motor 53, and configured to reduce the speed of the motor shaft of the motor 53 by a certain ratio such that the output shaft 58 can rotate at a desired lower speed. Two gears 591 and 592 are respectively fixed to ends of the output shaft 58 and the ball screw 542 at an outer side of the cap 546. The two gears 591 and 592 are engaged with each other, which transmits rotary motion from the output shaft 58 to the ball screw 542.

Figure 9:
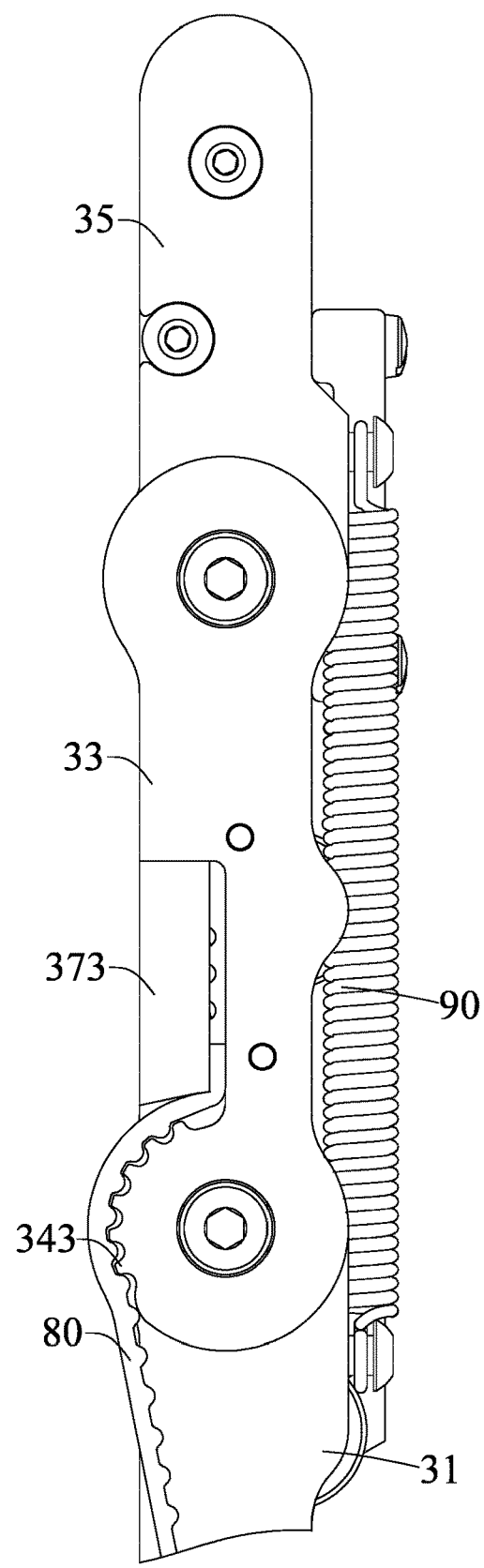
FIG. 9 is a side view of the upper portion of the finger of FIG. 3.

With reference to FIGS. 7 and 9, in one embodiment, each of the fingers 30 further includes an extension spring 90 having opposite ends coupled to the third phalanx 35 and the second end of the first phalanx 31. More specifically, the extension spring 90 is fixed to second side member 362 of the third phalanx 35 and the linkage bar 32 under the second side member 362. The extension spring 90 is configured to apply a restoring force to each of the second phalanx 33 and the third phalanx 35 so as to return the second phalanx 33 and the third phalanx 35 from a flexed state to the extended state. The extension spring 90 of FIG. 9 is slightly stretched a short distance from its free state so that the extension spring 90 can store energy. The initially stretched extension spring 90 keeps the second phalanx 33 and the third phalanx 35 in the extended state as shown in FIG. 9. The finger 30 is flexed when the motor 53 is operating, causing the extension spring 90 to be further stretched. The extension spring 90 then applies a pulling force to the second phalanx 33 and the third phalanx 35. After the motor 53 is stopped, the pulling force acting on the second phalanx 33 and the third phalanx 35 returns them from a flexed state to the extended state.

With reference to FIGS. 3 and 7 again, in one embodiment, opposite ends of the first tendon 70 are respectively attached to the third phalanx 35 and the second end of the first phalanx 31 of each of the first fingers 30 and the second finger 40. More specifically, the first tendon 70 is fixed to the first side member 361 of the third phalanx 35 and the linkage bar 32 under the first side member 361. Each of the first fingers 30 and the second finger 40 may further include a second tendon 80 having opposite ends that are respectively attached to the first end of the second phalanx 33 and the baseplate 20. More specifically, the second tendon 80 is fixed to one linkage bar 34 and the fixing plate 501 under the linkage bar 34. The third phalanx 35 includes a first engagement portion 369 arranged around the third axis of rotation L3. The first tendon 70 is wrapped around at least a portion of the first engagement portion 369. The second phalanx 33 includes a second engagement portion 341 arranged around the second axis of rotation L2, and the second tendon 80 is wrapped around at least a portion of the second engagement portion 341.

In the embodiment, the first engagement portion 369 is a portion of the lower end of the first side member 361 of the third phalanx 35. As shown in FIG. 7, the first side member 361 defines a recess 370 adjacent to the first engagement portion 369. A tendon fixing member 371 is fixed to the connection member 363 and fit in the recess 370. One end of the first tendon 70 is securely sandwiched between the tendon fixing member 371 and the bottom of the recess 370. Similarly, a tendon fixing member 372 is fixed to the second end of the linkage bar 32 under the first engagement portion 369. The other end of the first tendon 70 is securely sandwiched between the tendon fixing member 372 and the second end of the linkage bar 32. In the embodiment, as shown in FIG. 9, the extension spring 80 is located at a back side of the finger 30 that faces away from the first engagement portion 369.

With reference to FIG. 7, in one embodiment, the second engagement portion 341 is a portion of the lower end of the linkage bar 34 that is opposite the tendon fixing member 372. The linkage bar 34 defines a recess 342 adjacent to the second engagement portion 341. A tendon fixing member 373 is received in the recess 342, and one end of the second tendon 80 is securely sandwiched between the tendon fixing member 373 and the bottom of the recess 342. With reference to FIGS. 3 and 6, in the embodiment, the other end of the second tendon 80 is fixed to the baseplate 20 through the fixing plate 501 under the second engagement portion 341. Specifically, a tendon fixing member 374 is fixed to the fixing plate 501 under the second engagement portion 341. The other end of the second tendon 80 is securely sandwiched between the tendon fixing member 374 and the upper end of the fixing plate 501 under the second engagement portion 341. With reference to FIG. 9, in one embodiment, the second tendon 80 is a timing belt, and the second engagement portion 341 has a number of teeth 343 that are engaged with the timing belt 80 and arranged around the axis of rotation L2. Similarly, the first tendon 70 is a timing belt, and the first engagement portion 369 has a number of teeth 3691 (see FIG. 7) that are engaged with the timing belt 70 and arranged around the axis of rotation L3.

Figure 10:
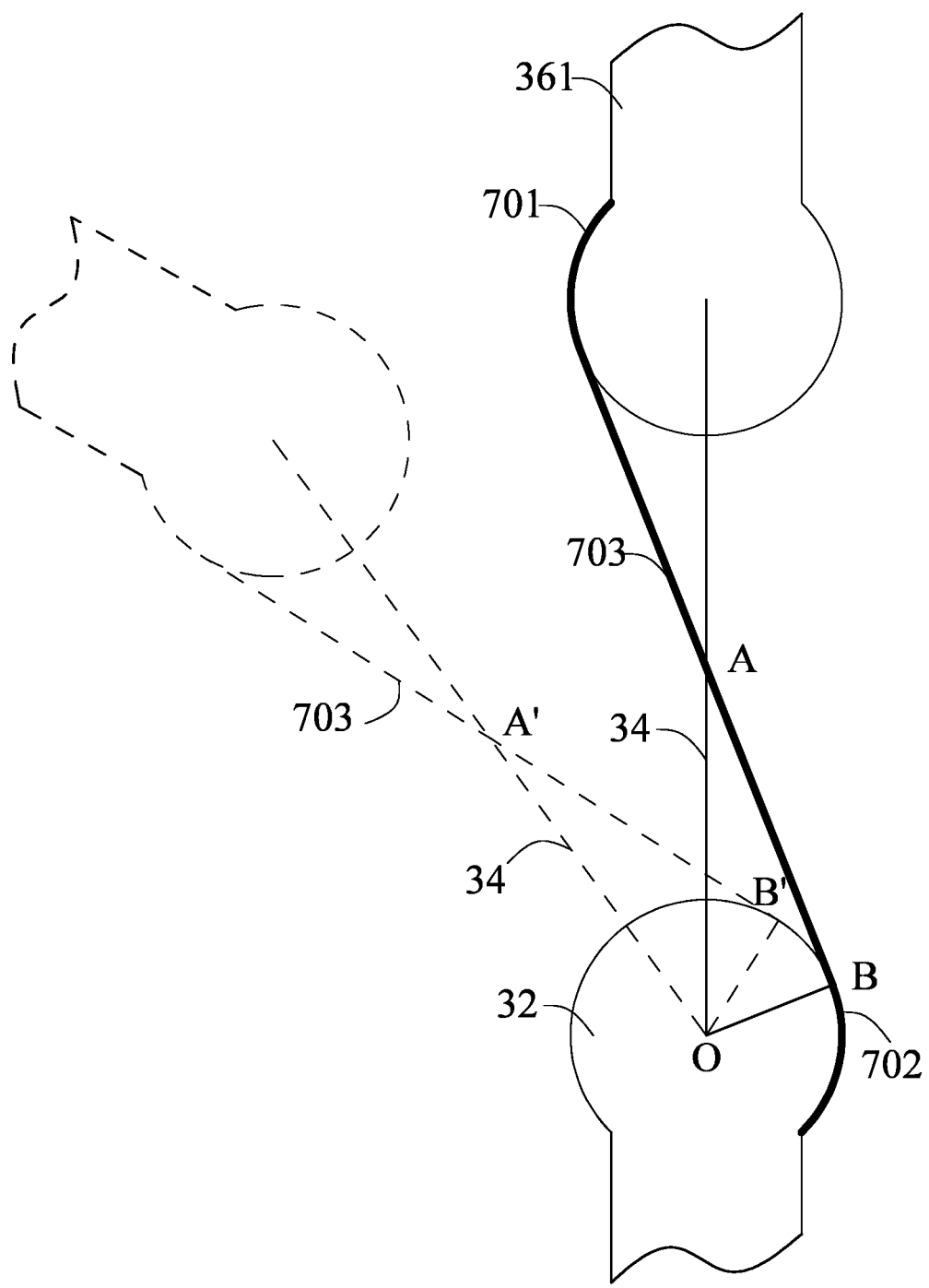
FIG. 10 is schematic diagram showing a second phalanx and a third phalanx rotating from the extended state to a flexed state.

In the embodiment, the first tendon 70 is configured to achieve a desired ratio of the angular speed of the second phalanx 33 to the angular speed of the third phalanx 35. The radius of an addendum circle touching the outermost points of the teeth 3691 of the first engagement portion 369 is substantially equal to the radius of the upper end of the linkage bar 32 under the first engagement portion 369. The desired ratio is then equal to 1. This will become apparent from the following discussion associated with FIG. 10 that shows the second phalanx 33 and the third phalanx 35 in the extended state (continuous lines) and in a flexed state (dotted lines). As shown in FIG. 10, the first tendon 70 can be divided into three segments: a first segment 701 wrapped around the first engagement portion 369, a second segment 702 wrapped around the upper end of the linkage bar 32 under the first engagement portion 369, and a third segment 703 connecting the first segment to the second segment. The length of the third segment 703 remain unchanged during rotation of the second phalanx 33 and the third phalanx 35.

Rotation of the third phalanx 35 about the axis of rotation L3 from the extended state of FIG. 10 to the flexed state of FIG. 10 results in decrease in the length of the first segment 701 wrapped around the first engagement portion 369. The decreased length of the first segment 701 is equal to the arc length of the arc of a circle corresponding to the angle of rotation of the third phalanx 35. Rotation of the second phalanx 33 about the axis of rotation L2 from the extended state of FIG. 10 to the flexed state of FIG. 10 results in increase in the length of the second segment 702 wrapped around the upper end of the linkage bar 32 under the first engagement portion 369. The increased length is equal to the arc length of the arc between points B and B'. Since the length of the third segment 703 remain unchanged during rotation of the second phalanx 33 and the third phalanx 35, the increased length of the second segment 702 is equal to the decreased length of the first segment 701. Since the radius of the addendum circle is substantially equal to the radius of the upper end of the linkage bar 32 under the first engagement portion 369, the angle of rotation of the third phalanx 35 about the axis of rotation L3 is equal to angle ∠BOB' of the arc between points B and B' of FIG. 10. Since the length of the third segment 703 remain unchanged during rotation of the second phalanx 33 and the third phalanx 35, and the third segment 703 is always tangent to the circle representing the cylindrical surface of the upper end of the linkage bar 32, the two triangles ΔA'OB' and ΔAOB are congruent. Then, the angle ∠A'OB' is equal to the angle ∠AOB. Thus, the angle ∠AOA' representing the angle of rotation of the second phalanx 33 about the axis of rotation L2 is equal to the angle ∠BOB' that is equal to the angle of rotation of the third phalanx 35 about the axis of rotation L3. According to the expression ω=θ/t, where ω represents angular speed, θ represents angle of rotation, and t represent time, the angular speed of the third phalanx 35 is equal to the angular speed of the second phalanx 33 during their rotation from the extend sate to the flexed state of FIG. 10. This also applies to any circumstance in which the second phalanx 33 and the third phalanx 35 rotate between the extended state and any flexed state.

It should be noted that in other embodiments the ratio of the angular speed of the second phalanx 33 to the angular speed of the third phalanx 35 can change according to actual needs by changing the ratio of the radius of the addendum circle touching the outermost points of the teeth 3691 of the first engagement portion 369 to the radius of the upper end of the linkage bar 32 under the first engagement portion 369. Similarly, the first phalanx 31 can rotate at the same angular speed as the second phalanx 33 by the arrangement that the radius of the addendum circle touching the outermost points of the teeth 343 of the second engagement portion 341 is equal to the radius of the upper end of the fixing plate 501 under the second engagement portion 341.

When the first phalanx 31, the second phalanx 33 and the third phalanx 35 are rotated to a flexed state (e.g., the flexed state as shown in FIG. 4), the extension spring 90 is elastically stretched, causing a pulling force to act on the third phalanx 35 and causing a pulling force to be transferred to the upper end of the second phalanx 33, which causes a torque to act on the third phalanx 35 and the second phalanx 33. The torque acting on the third phalanx 35 causes the first segment 701 of the first tendon 70 to tightly wrap around the upper end of the linkage bar 34, which causes a force F1 (see FIG. 4) to act on the upper end of the linkage bar 34. Similarly, the torque acting on the second phalanx 33 causes a portion of the second tendon 80 to tightly wrap around the upper end of the linkage bar 32, which causes a force F2 (see FIG. 4) to act on the upper end of the linkage bar 32. After the linear actuator 51 is stopped, the force F2 drives the first phalanx 31 to rotate back to the extended state as shown in FIG. 3, the extension spring 90 and the force F1 drive the second phalanx 33 to rotate back to the extended state as shown in FIG. 3, and the extension spring 90 drives the third phalanx 35 to rotate back to the extended state as shown in FIG. 3.

Figure 11:
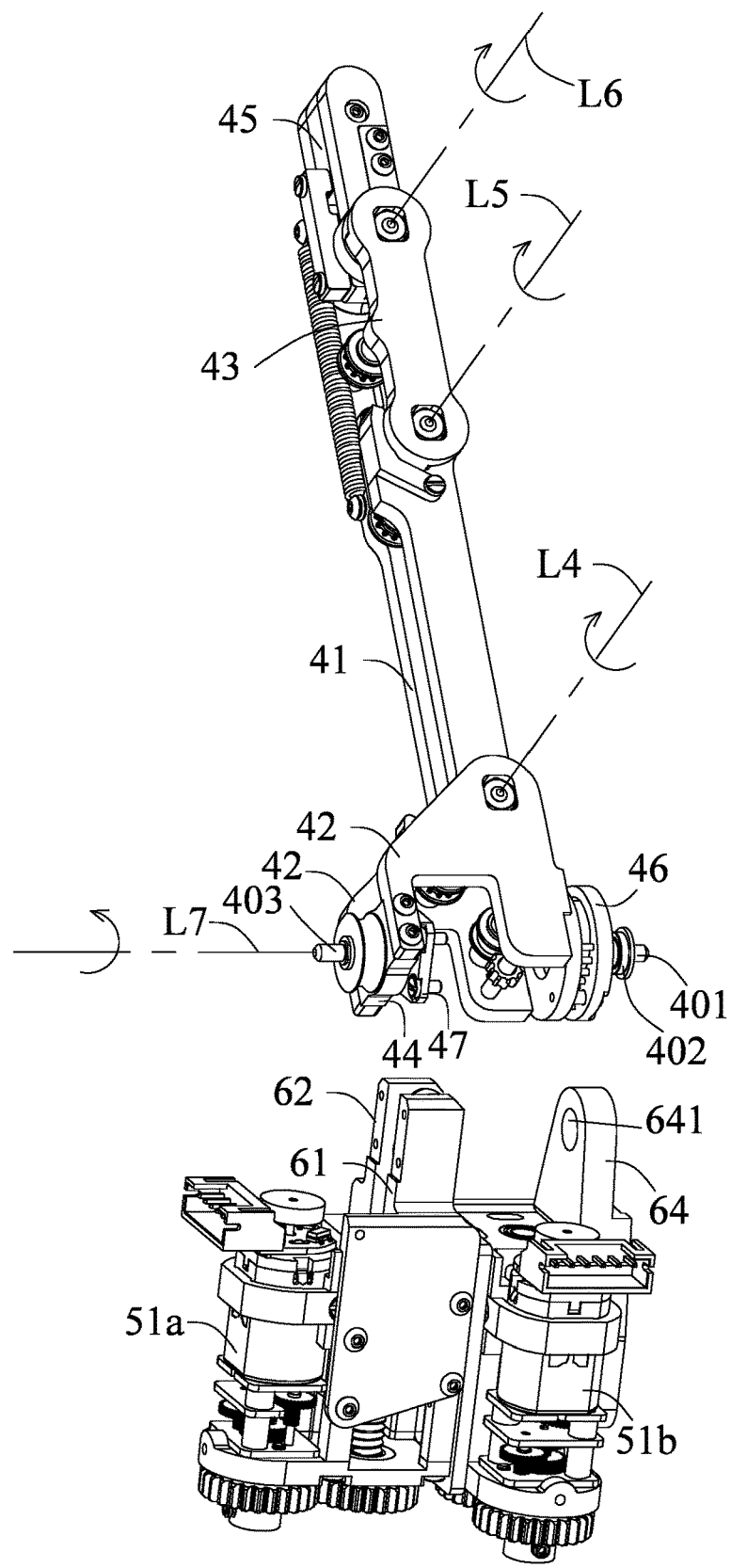
FIG. 11 is an isometric view of a finger of the robotic hand according to another embodiment.

With reference to FIG. 11, in one embodiment, the second finger 40 includes a first phalanx 41, a second phalanx 43 and a third phalanx 45 that are shaped, sized and configured in the same manner as the first phalanx 31, the second phalanx 33 and the third phalanx 35 of one first finger 30. The first phalanx 41, the second phalanx 43 and the third phalanx 45 are rotatable about three axes of rotation L4, L5 and L6 that are substantially parallel to one another. The first phalanx 41 is in directly coupled to the baseplate 20 through the actuating mechanism 60.

Figure 12:
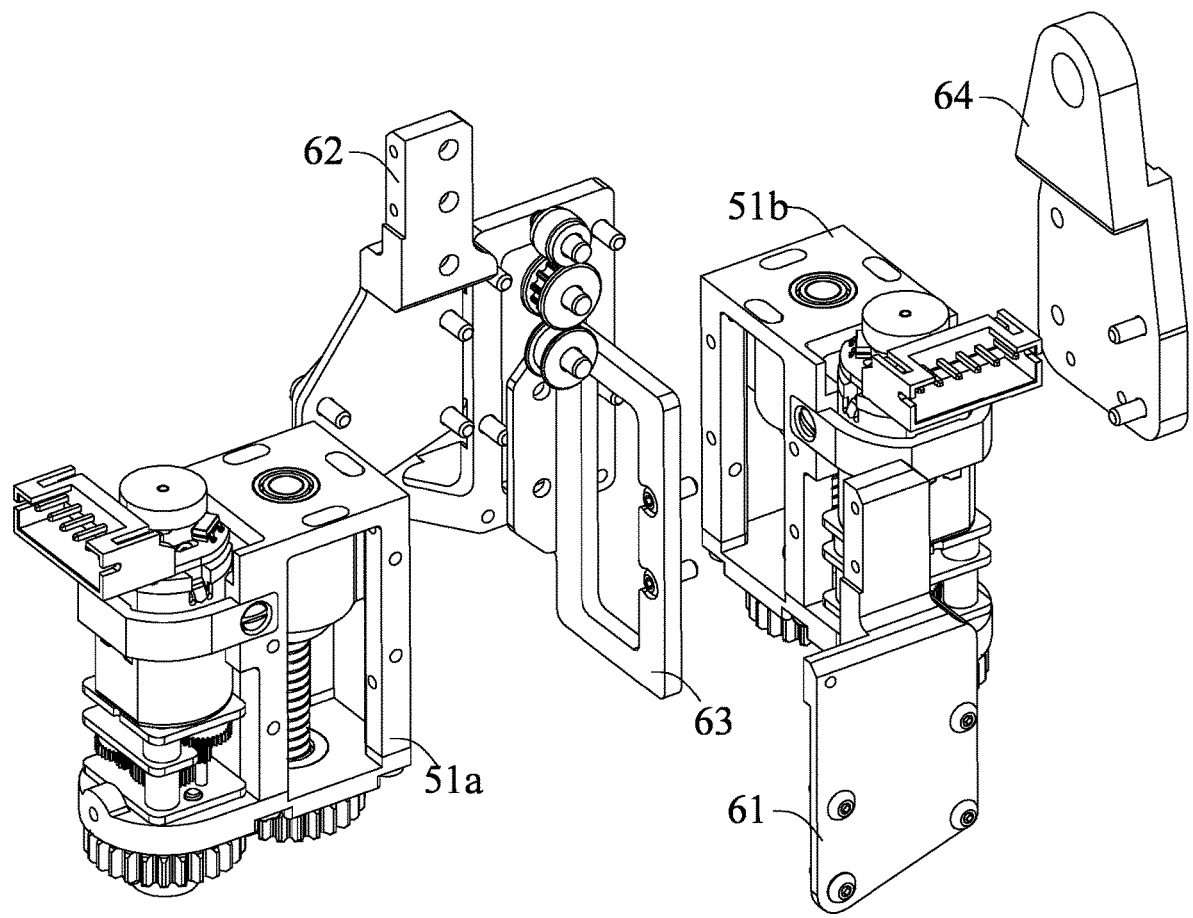
FIG. 12 is an isometric exploded view of an actuating mechanism of the robotic hand according to another embodiment.

With reference to FIG. 12, in one embodiment, the actuating mechanism 60 includes two linear actuators 51 (i.e., linear actuator 51a and linear actuator 51b), a front plate 61, a rear plate 62, an inner plate 63, and a side plate 64. The linear actuator 51a is configured to actuate rotation of the first phalanx 41, the second phalanx 43, and the third phalanx 45, and the linear actuator 51b is configured to actuate rotation of the whole finger 40 about an axis of rotation L7, which is similar to palmar abduction/adduction of the thumb a human hand. The axis of rotation L7 and each of the axes of rotation L4, L5 and L6 are skew lines. The front plate 61 is fixed to two bars 545 of the linear actuator 51a, and the rear plate 62 is fixed to another two bars 545 of the linear actuator 51a opposite the front plate 61. The two bars 545 of the liner actuator 51b which the sliding member 55 moves between are fixed to one side surface of the inner plate 63. Two bars 545 of the linear actuator 51b are fixed to the side surface of the inner plate 63 facing away from the linear actuator 51a. The side plate 64 is fixed to two bars 545 of the linear actuator 51b that is opposite the inner plate 63.

With reference to FIG. 11 again, in one embodiment, the second finger 40 further includes two connection plates 42, a side plate 44, and an abduction/adduction (AA) pulley 46. Lower ends of two linkage bars of the first phalanx 41 are rotatably coupled to the upper ends of the two connection plates 42. The side plate 44 is arranged between and fixed to the two connection plates 42, and the AA pulley 46 is fixed to the two connection plates 42 opposite the side plate 44. In one embodiment, the second finger 40 is rotatably coupled to the actuating mechanism 60 through shafts and bearings. Specifically, the AA pulley 46 is arranged around a first shaft 401. The side plate 64 defines a bearing hole 641 in its upper end. The inner ring of a first bearing 402 is arranged around the first shaft 401, and the outer ring of the first bearing 402 is fit in the bearing hole 641. A second shaft 403 is connected to the side plate 44, and a bearing holder 47 is fixed to the front plate 61 and the rear plate 62. The inner ring of a second bearing (not shown) is arranged around the second shaft 403, and the outer ring of the second bearing is fit in a bearing hole defined in the bearing holder 47. With such configuration, the finger 40 is rotatably coupled to the actuating mechanism 60, and is rotatable about the axis of rotation L7. In the embodiment, the finger 40 further includes a belt 48 (see FIG. 1) having opposite ends that are fixed to the AA pulley 46 and the sliding member 55 of the linear actuator 51b. The belt 48 is configured to move together with the sliding member 55 and pull the AA pulley 46, causing the finger 40 to rotate about the axis of rotation L7.

Figure 13:
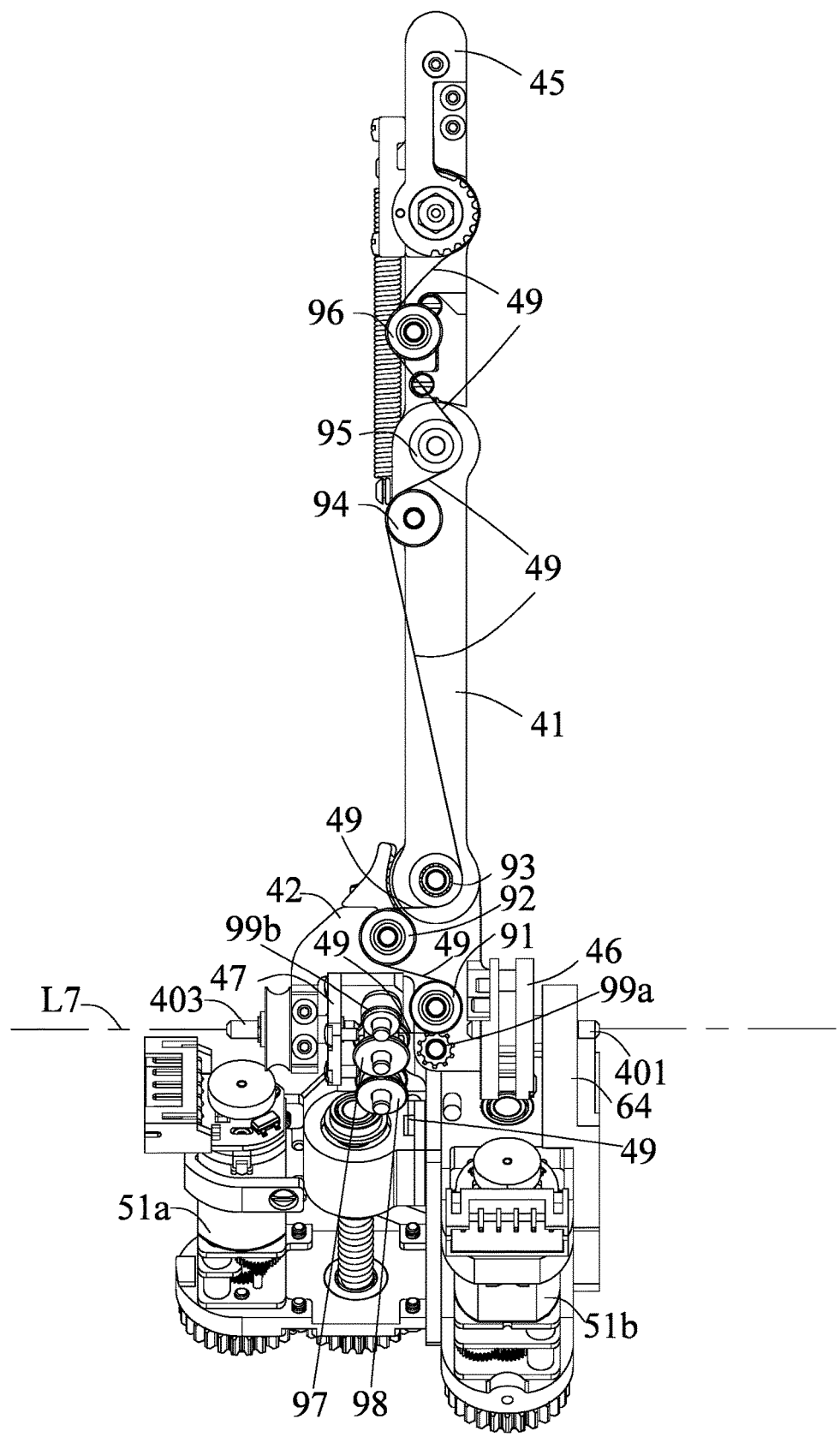
FIG. 13 is a side view of the finger of FIG. 11.

With reference to FIG. 13, similar to the fingers 30, the finger 40 further includes a flexor 49 having opposite ends attached to the third phalanx 45 and the linear actuator 51a. The linear actuator 51a is configured to provide a linear motion to pull the flexor 49. The flexor 49 is configured to pull the first phalanx 41, the second phalanx 43, and the third phalanx 55 to rotate so as to flex the finger 40. The robotic hand 10 may further include a number of idler pulleys for guiding the flexor 49 and reducing vibration of the flexor 49. In one embodiment, two of the idler pulleys that are respectively coupled to the finger 40 and the actuating mechanism 60 are configured to render a portion of the flexor 49 to extend along the axis of rotation L7. The portion of the flexor 49 is twisted during rotation of the finger 40 about the axis of rotation L7, allowing the flexor 49 to be pulled for flexion of the finger 40. Specifically, similar to the fingers 30, the finger 40 may include a first idler pulley 91, a second idler pulley 92, a third idler pulley 93, a fourth idler pulley 94, a fifth idler pulley 95, and a sixth idler pulley 96, which can be arranged in a similar or same manner as the idler pulleys 81 through 86. The actuating mechanism 60 may further include two idler pulleys 97 and 98 that are rotatably coupled to the front plate 61 and the rear plate 62. The flexor 49 runs over these idler pulleys 91 through 98, and these idler pulleys 91 through 98 rotate and guide the flexor 49 when the flexor 9 is pulled by the linear actuator 51a and moves relative to these idler pulleys 91 through 98.

In the embodiment, the first idler pulley 91 and the idler pulley 97 are configured in such a way that a portion 491 of the flexor 49 between the first idler pulley 91 and the idler pulley 97 extends along the axis of rotation L7. During rotation of the finger 40 about the axis of rotation L7, the portion 491 is twisted, and the tension on the flexor 49 remains unchanged. That is, the flexor 49 does not become loose during rotation of the finger 40 about the axis of rotation L7. The flexor 49 can have a proper response to immediately pull the phalanges of the finger 40 when the linear actuator 51a starts to operate. In the embodiment, an auxiliary wheel 99a is rotatably coupled to the connection plates 42 under the first idler pulley 91. The auxiliary wheel 99a is configured to apply a pushing force to the flexor 49 such that the flexor 49 can have an effective contact area with the first idler pulley 91 after the portion 491 has been twisted. Similarly, an auxiliary wheel 99b is rotatably coupled to the front plate 61 and the rear plate 62 above the idler pulley 97. The auxiliary wheel 99b is configured to apply a pushing force to the flexor 49 such that the flexor 49 can have an effective contact area with the idler pulley 97 after the portion 491 has been twisted.

Figure 14:
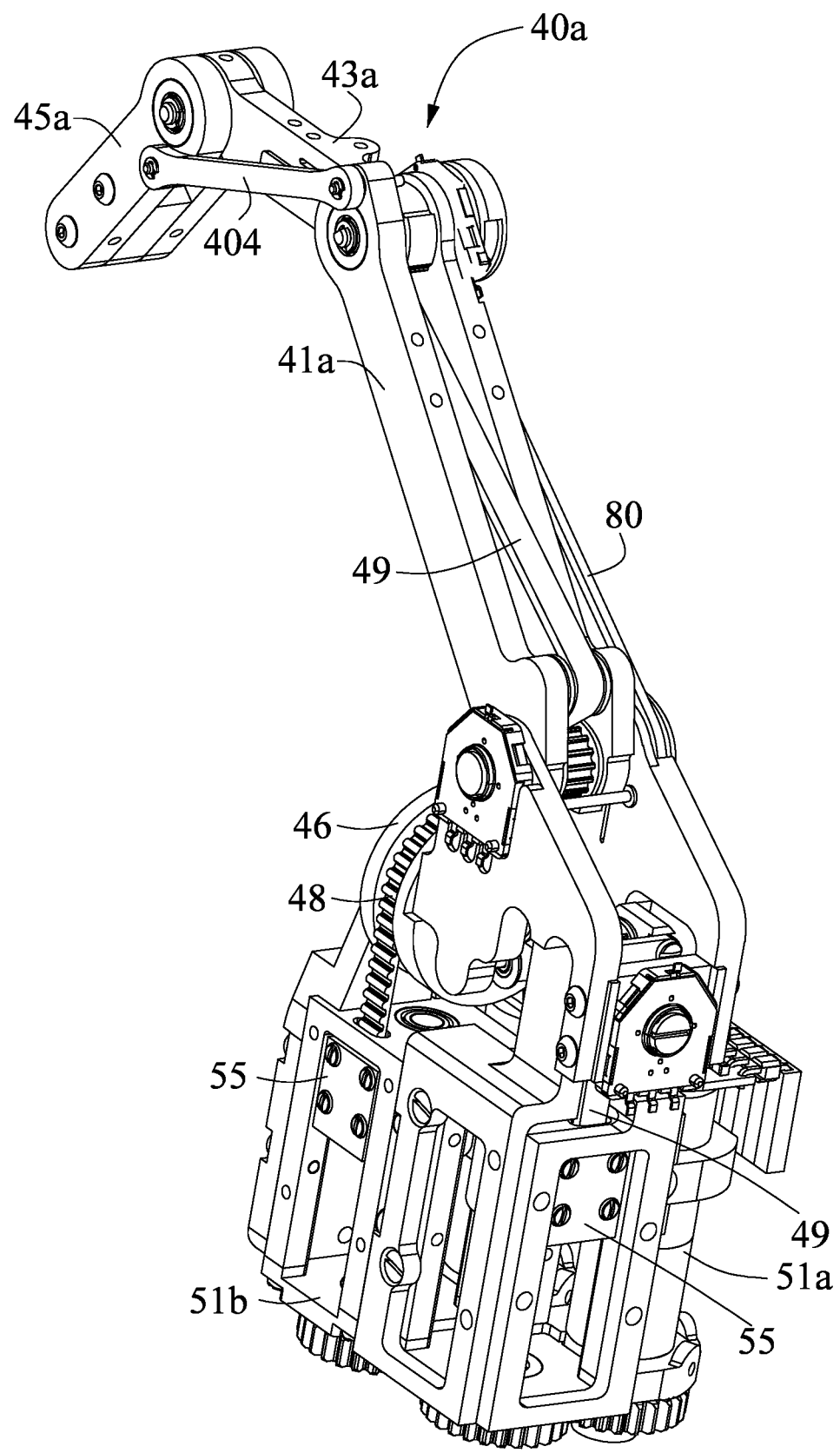
FIG. 14 is an isometric view of a finger of the robotic hand according to another embodiment.

FIG. 14 shows a second finger 40a according to one embodiment. The finger 40a is similar to the finger 40, and includes a first phalanx 41a, a second phalanx 43a and a third phalanx 45a that are rotatably coupled to one another. The linear actuator 51a is used to actuate the rotation of the first phalanx 41a, the second phalanx 43a and the third phalanx 45a by pulling the flexor 49, and the linear actuator 51b is used to actuate the rotation of the finger 40a by pulling the belt 48, which is similar to palmar abduction/adduction of the thumb a human hand. The fingers 40a and 40 differ in that the upper end of the flexor 49 is fixed to the second phalanx 43a, the first tendon 70 is omitted, and the finger 40a further includes a linkage bar 404 that has opposite ends rotatably coupled to the third phalanx 45a and the first phalanx 41a. The first phalanx 41a, the second phalanx 43a, the third phalanx 45a, and the linkage bar 404 constitute a four-bar linkage mechanism. When the first linear actuator 51a is started, the flexor 49 applies a pulling force that drives the second phalanx 43a to rotate, a pulling force transferred to the upper end of the first phalanx 41a drives the first phalanx 41a to rotate, and rotation of the second phalanx 43a results in rotation of the third phalanx 41a because of the four-bar linkage mechanism. The tendon 80 allows for a desired ratio of the angular speed of the second phalanx 43a to the angular speed of the first phalanx 41a. In addition, a desired ratio of the angular speed of the second phalanx 43a to the angular speed of the third phalanx 45a can be achieved by setting the configuration of the four-bar linkage mechanism according to a kinematic analysis result.

Figure 15:
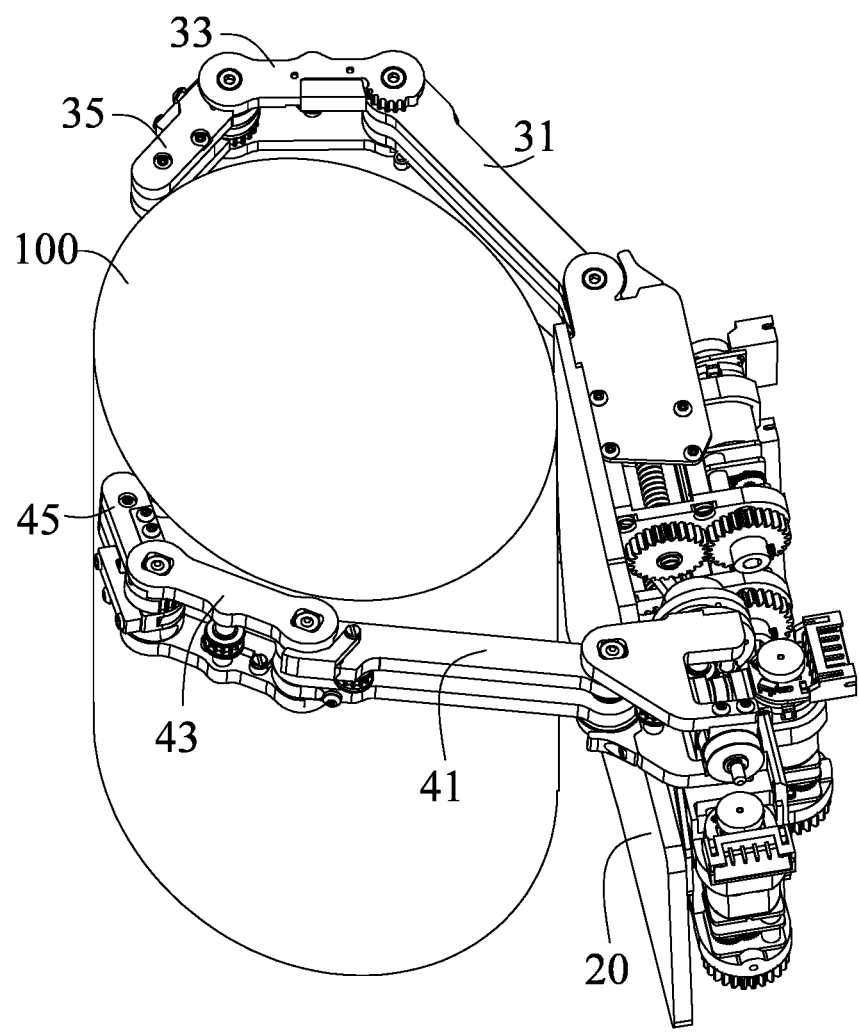
FIG. 15 shows the robotic hand grasping an object.

FIG. 15 shows that the fingers 30 and 40 are flexed to grasp a cylindrical object 100 (e.g., water bottle). In this case, the robotic hand 10 forms a power grasp by using the baseplate 20 and the fingers 30 and 40. The robotic hand 10 can also form a precision grasp, such as chuck grip, key grip, and pincer grasp, by using two or more of the fingers 30 and 40.

The fingers 30 of the robotic hand 10 according to the embodiments above each require one actuating mechanism to drive all the phalanges, which is simple in structure and makes the robotic hand 10 lightweight. The fingers 30 and 40 each is provided as a single module, and the modular design allows for easy reconfiguration of the robotic hand. In addition, the robotic hand can provide sufficient gripping force to objects of different sizes, which allows the robot hand to adapt to various application environments. This is because an undisturbed phalanx is always free to move even if one of the phalanges is stopped by an obstacle. For example, when grasping the object 100 of FIG. 15, the first phalanges 31 come into contact with the lateral surface of the object 100 before contact of the second phalanges 33 and third phalanges 35 with the object 100. After that, rotation of the second phalanges 33 and third phalanges 35 continues until the third phalanges 35 come into contact with the object 100.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:
1. A robotic hand, comprising:
a baseplate;
a finger comprising:
  a first phalanx having an elongated body defining a first end and an opposite second end, the first end rotatably coupled to the baseplate and rotatable about a first axis of rotation,
  a second phalanx having a first end and an opposite second end, the first end of the second phalanx rotatably coupled to the second end of the first phalanx and rotatable about a second axis of rotation parallel to the first axis of rotation; and
  a third phalanx rotatably coupled to the second end of the second phalanx, the third phalanx rotatable about a third axis of rotation parallel to the first axis of rotation;
an actuating mechanism mounted on the baseplate, the actuating mechanism configured to actuate rotation of the first phalanx, the second phalanx, and the third phalanx; and
a first tendon having opposite ends that are respectively attached to the third phalanx and the second end of the first phalanx;
wherein the third phalanx comprises a first engagement portion arranged around the third axis of rotation, and the first tendon is wrapped around at least a portion of the first engagement portion so as to generate a force acting on the second end of the second phalanx, causing the second phalanx to rotate from a flexed state to an extended state.

2. The robotic hand of claim 1, wherein the first tendon is a timing belt, and the first engagement portion comprises a plurality of teeth that are engaged with the timing belt.

3. The robotic hand of claim 1, wherein the actuating mechanism comprises a linear actuator and a flexor having opposite ends attached to the third phalanx and the linear actuator;
the linear actuator configured to provide a linear motion to pull the flexor, and the flexor is configured to pull the first phalanx, the second phalanx, and the third phalanx to rotate so as to flex the finger.

4. The robotic hand of claim 3, wherein the linear actuator comprises a motor, a transmission mechanism fixed to the baseplate, and a sliding member; the motor and the sliding member are coupled to the transmission mechanism, the transmission mechanism is configured to convert rotary motion of the motor to linear motion of the sliding member, one of the opposite ends of the flexor is fixed to the sliding member.

5. The robotic hand of claim 1, further comprising an extension spring having opposite ends coupled to the third phalanx and the second end of the first phalanx, wherein the extension spring is configured to apply a restoring force to each of the second phalanx and the third phalanx so as to return the second phalanx and the third phalanx to the extended state.

6. The robotic hand of claim 5, wherein the extension spring is located at a back side of the finger that faces away from the first engagement portion.

7. The robotic hand of claim 4, wherein the transmission mechanism comprises a frame fixed to the baseplate, a back-drivable ball screw that is rotatably coupled to the frame and configured to receive the rotary motion, and a collar rotatably coupled to the ball screw and slidable relate to the frame, and the sliding member is fixed to the collar.

8. The robotic hand of claim 1, further comprising a second tendon having opposite ends that are respectively attached to the first end of the second phalanx and the baseplate, wherein the second phalanx comprises a second engagement portion arranged around the second axis of rotation, and the second tendon is wrapped around at least a portion of the second engagement portion so as to generate a force acting, on the second end of the first phalanx, causing the first phalanx to rotate back to the extended state.

9. A robotic hand, comprising:
a baseplate;
a cable-driven finger comprising:
a first phalanx haying an elongated body defining a first end and an opposite second end, the first. end rotatably coupled to the baseplate and rotatable about a first axis of rotation;
a second phalanx having a first end and an opposite second end, the first end of the second phalanx rotatably coupled to the second end of the first phalanx and rotatable about a second axis of rotation parallel to the first axis of rotation; and
a third phalanx rotatably coupled to the second end of the second phalanx, the third phalanx rotatable about a third axis of rotation parallel to the first axis of rotation;
a first tendon having opposite ends that are respectively attached to the third phalanx and the second end of the first phalanx, the first tendon configured to generate a force that acts on the second end of the second phalanx and causes the second phalanx to rotate from a flexed state to an extended state.

10. The robotic hand of claim 9, wherein the first tendon is a timing belt, and the third phalanx comprises a plurality of teeth that are engaged with the timing belt.

11. The robotic hand of claim 9, further comprising an actuating mechanism mounted on the baseplate, wherein the actuating mechanism comprises a linear actuator and a flexor having opposite ends attached to the third phalanx and the linear actuator; the linear actuator configured to provide a linear motion to pull the flexor, and the flexor is configured to pull the first phalanx, the second phalanx, and the third phalanx to rotate so as to flex the finger.

12. The robotic hand of claim 11, wherein the linear actuator comprises a motor, a transmission mechanism fixed to the baseplate, and a sliding member; the motor and the sliding member are coupled to the transmission mechanism, the transmission mechanism is configured to convert rotary motion of the motor to linear motion of the sliding member, one of the opposite ends of the flexor is fixed to the sliding member.

13. The robotic hand of claim 12, wherein the transmission mechanism comprises a frame fixed to the baseplate, a back-drivable ball screw that is rotatably coupled to the frame and configured to receive the rotary motion, and a collar rotatably coupled to the ball screw and slidable relate to the frame, the sliding member is fixed to the collar.

14. The. robotic hand of claim 9, further comprising an extension spring having opposite ends coupled to the third phalanx and the second end of the first phalanx, wherein the extension spring is configured to apply a restoring force to each of the second phalanx and the third phalanx so as to return the second phalanx and the third phalanx to the extended state.

15. The robotic hand of claim 9, further comprising a second tendon having opposite ends that are respectively attached to the first end of the second phalanx and the baseplate, wherein the second phalanx comprises an engagement portion arranged around the second axis of rotation, and the second tendon is wrapped around at least a portion of the engagement portion so as to generate a force acting on the second end of the first phalanx, causing the first phalanx to rotate back to the extended state.

16. A robotic hand, comprising:
a baseplate;
a finger comprising a plurality of phalanges that are rotatably coupled to one another, a first of the plurality of phalanges having a first end rotatably coupled to the baseplate and a second end, a second of the plurality of phalanges rotatably coupled to the second end about an axis of rotation;
an actuating mechanism mounted on the baseplate, the actuating mechanism configured to actuate rotation of the plurality of phalanges; and
a tendon having opposite open ends that are respectively fixed to the second of the plurality of phalanges and the baseplate,
wherein the second of the plurality of phalanges comprises an engagement portion arranged around the axis of rotation, and the tendon is wrapped around at least a portion of the engagement portion so as to generate a force acting on the second end of the first of the plurality of phalanges, causing the first of the plurality of phalanges to rotate from a flexed state to an extended state.

17. The robotic hand of claim 16, wherein the tendon is a timing belt, and the engagement portion comprises a plurality of teeth that are engaged with the timing belt.

18. The robotic hand of claim 16, wherein the actuating mechanism comprises a linear actuator and a flexor having opposite ends attached to a last of the plurality of phalanges and the linear actuator; the linear actuator configured to provide a linear motion to pull the flexor, and the flexor is configured to pull the plurality of phalanges to rotate so as to flex the finger.

19. The robotic hand of claim 18, wherein the linear actuator comprises a motor, a transmission mechanism fixed to the baseplate, and a sliding member; the motor and the sliding member are coupled to the transmission mechanism, the transmission mechanism is configured to convert rotary motion of the motor to linear motion of the sliding member, one of the opposite ends of the flexor is fixed to the sliding member.

20. The robotic hand of claim 19, wherein the transmission mechanism comprises a frame fixed to the baseplate, a back-drivable ball screw that is rotatably coupled to the frame and configured to receive the rotary motion, and a collar rotatably coupled to the ball screw and slidable relate to the frame, the sliding member is fixed to the collar.

\* \* \* \* \*